L. R. CLARK & D. G. KREUL.
FILTER.
APPLICATION FILED FEB. 3, 1910.
974,025.
Patented Oct. 25, 1910.
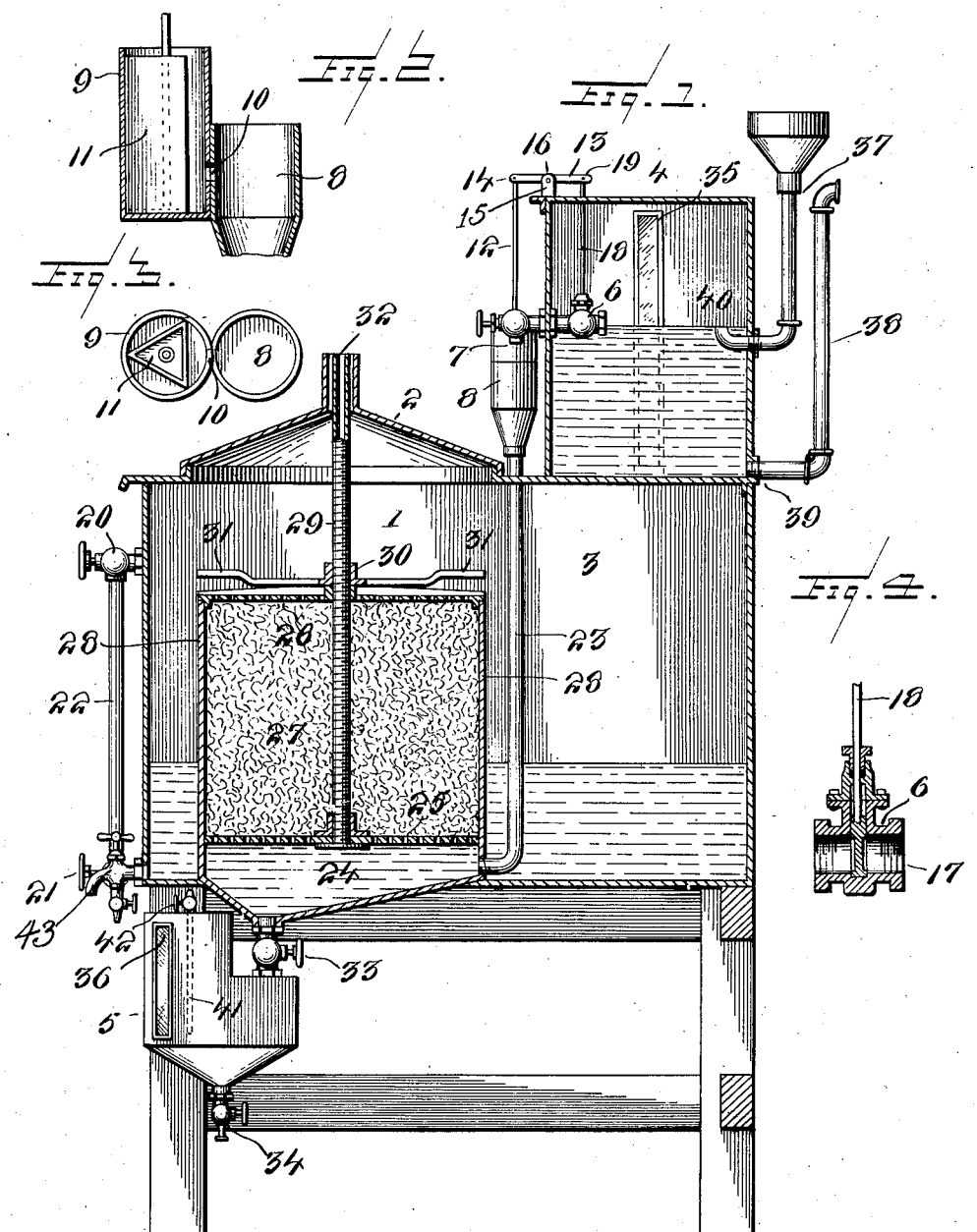
WITNESSES:
INVENTORS
Lucius R. Clark
Dwight G. Kreul
BY
Victor L. Dodge,
Attorney

UNITED STATES PATENT OFFICE.

LUCIUS R. CLARK AND DWIGHT G. KREUL, OF DAVENPORT, IOWA.

FILTER.

974,025.  Specification of Letters Patent.  Patented Oct. 25, 1910.

Application filed February 3, 1910. Serial No. 541,797.

*To all whom it may concern:*

Be it known that we, LUCIUS R. CLARK and DWIGHT G. KREUL, citizens of the United States, whose post-office address is Davenport, in the county of Scott and State of Iowa, have invented a new and useful Improvement in Oil-Filters, of which the following is a specification, reference being had therein to the accompanying drawing, forming a part thereof.

Our invention relates to improvement in oil filters.

The object of our invention is to provide a filter adapted to remove the impurities from oil that has been once used as a lubricant and has been mixed with impurities arising from such use and consists in the construction and arrangement of parts as will be hereinafter described and particularly pointed out in the claims.

Our invention provides further, a filter having an outer casing, a chamber within said casing for receiving the impure oil, means by which the oil is carried first downward from the receiving chamber to the inside of a settling chamber and upward through an appropriate filtering medium to the receiving chamber for pure oil, from which it may be drawn by a faucet.

Figure 1 is a vertical section of our improved apparatus, showing the parts in a closed position, Fig. 2 is a sectional view of the float mechanism, Fig. 3 is a top plan view of the same and Fig. 4 is a detail of the sliding gate.

Referring more particularly to the drawings which are for illustrative purposes only and are not drawn to scale, 1 is the main chamber, provided with a cover 2, the chamber and cover being preferably cylindrical in shape, 3 is the receiving chamber for pure oil, 4 is an oil supply chamber for the reception of impure oil, 5 is a settling chamber attached to the base of the filter, 6 is a pipe leading from the receiving chamber discharging through angle valve 7 into the funnel 8, 9 is the float chamber connected to the funnel by the opening 10. A hollow polyhedral float is shown within the float chamber as a triangular prism, at 11, a rod 12 is swiveled to the bottom of the float and to the extremity of a lever 13, the lever is pivoted to a support 15 at 16, a sliding gate 17 is adapted to close pipe 6 and the gate is swiveled to a rod 18, which rod is swiveled to lever 13 at 19. Cocks 20 and 21 admit the filtered oil to the glass 22, impure oil is introduced within the settling chamber 24 by means of the descending oil tube 23, horizontal disks 25 and 26 having coarse perforations compress the filtering medium of cotton waste or other suitable material 27 within the cylinder 28. A hollow threaded adjusting rod 29 receives a clamp 30 adapted to actuation for the purpose of compressing the filtering medium by levers 31. An air vent 32 connected at its lower extremity interiorly with the adjusting rod 29 affords an exit for air from the settling chamber 24. A cock 33 regulates the flow of oil or sediment from chamber 24 to settling basin 5, and a cock 34 at the base of basin 5 regulates the discharge of the contents of the lower chamber into the waste pipe. Sight glasses 35 and 36 afford a view of chambers 4 and 5 respectively. Oil is introduced into the receiving chamber 4 through the pipe 37, pipe 38 provided with ground union 39 affords a means of withdrawal of water from chamber 4, pipe 37 terminating in an upturned L 40 provides a means for the introduction of impure oil into the receiving chamber with a minimum disturbance of the sediment at the bottom of said chamber. Provision is made for the withdrawal of air from settling chamber 5 through a cock 42.

Our invention is operated as follows: Oil is introduced through the pipe 37 and passes into the supply chamber 4, which may be square, cylindrical or of other convenient form, through the upturned L 40, within the chamber, which is introduced approximately midway of the depth of the chamber for the purpose of providing a space for settling in the bottom of the receiving chamber and the purpose of the upturned L is to prevent the disturbance of sediment in the bottom of this chamber by the impact of the flow. Pipe 38 is united to the receiving chamber near to the bottom thereof by a ground union 39, about which the pipe is rotatable and through which the contents of the chamber may be discharged by turning the pipe. A sight glass 35 exhibits the state of the oil and impurities of which the principal one to be extracted in this chamber is water which collects in the bottom of the chamber. The oil passes out of the receiving chamber through pipe 6, which is provided near its inlet with a valve 17. The outlet of pipe 6 is open to the air and it empties into a funnel 8, surmounting the descending oil tube 23. Funnel 8 is connected to the float chamber 9 by the opening 10, through which oil may flow from the funnel to the float chamber, where it will cause float 11 to rise, actuating rod 12, lever 13 and rod 18, and through the last rod referred to, actuating valve 17 in a direction opposite to that taken by the float, closing or partially closing pipe 6 to prevent an overflow of funnel 8. The float 11 is of polyhedral shape to prevent capillary attraction between the walls of the float chamber and the float.

From the funnel the oil passes to settling chamber 24 from which it passes by gravity through coarse openings in disk 25 to the filtering medium of cotton waste or other desirable material, through a similar plate 26 at the top of the filter and into the pure oil chamber 3, from which it may be drawn or pumped through cock 43. Provision is made for the extraction of air from the oil while in chamber 24, through the hollow adjusting rod 29 which receives the threaded clamping member 30 to press together the disks 25 and 26 to produce the desired resistance to the passage of the oil through the filtering medium. The air so extracted passes out of the filter through the vent 32 in the cover 2.

Heavy sediment passes downward from chamber 24 into chamber 5 provided with a sight glass 36 and an air vent 41 and the flow from chamber 24 is controlled by means of cock 33. The contents of this chamber are discharged into the waste pipe or otherwise, through cock 34. Chamber 5 is of angular form and the contents are introduced vertically at a point approximately midway of the depth of the chamber for the purpose of allowing any air still contained in the oil or its refuse to pass into the upper portion of the chamber and to prevent the reflow of the air backward through cock 33. When the contents of chamber 5 are withdrawn, or when the air within this chamber reaches a point below the lower extremity of pipe 41 the air will pass out when cock 42 is open. Levers 31 integral with clamping member 30 afford a means of compressing the filtering medium.

This filter is intended to be operated in groups, of which the device described constitutes a unit. The same head will actuate all feed pipes and the problem of getting the same work from the various units is met by setting the resistance in the filtering medium to meet the density of the particular oil passing through the unit. Should the unit be working "slow" the overflow from the open funnel will be prevented and the amount taken into the unit regulated by the float, which in turn is regulated by the backing up from the supply pipe and the resistance to which the medium is set.

Having thus fully described our invention, what we claim and desire to secure by Letters Patent is as follows:

1. In an oil filter, a receiving chamber, an inlet pipe let into the receiving chamber midway of its depth, the end of the inlet pipe bent to form an upturned L, a valve leading from the receiving chamber and disposed midway of its depth, a gravity pipe surmounted by a funnel and open to the air coöperating with the valve to take oil from the receiving chamber a settling chamber below the level of the receiving chamber, rigid connection between the lower end of the gravity pipe and the settling chamber a filter chamber formed with the settling chamber and adapted to receive oil upwardly from the settling chamber, a hollow threaded adjusting rod, disks adapted to receive the adjusting rod centrally, coarse perforations on the disks, a filtering medium between the disks, a clamp threaded to the adjusting rod, levers integral with the clamp to adjust clamp on rod, an air vent pipe removably connected to the adjusting rod to afford an outlet for air from the first settling chamber, a chamber for the reception of the purified oil, means for withdrawal of the purified oil.

2. In an oil filter, the combination with an upper receiving tank an inlet pipe let into the receiving chamber midway of its depth, a ground union at the lower part of the receiving chamber, a pipe leading from the chamber, rotatably attached to the ground union and bent to form an L, means for adjusting said pipe to the withdrawal of water from the receiving chamber, an outlet pipe in the receiving chamber midway of its depth, an angle valve at the outer termination of the outlet pipe, a valve at the inner terminus of the outlet pipe, a funnel open to the air beneath the angle valve, a float chamber integral with the funnel, free communication between the funnel and the float chamber, a hollow polyhedral float within the float chamber, a swivel interiorly disposed and fastened to the base of the polyhedral float, a support attached to the top wall of the receiving chamber at a point conveniently above the discharge pipe, a lever pivoted to this support, a rod swiveled to the outer end of this lever and the base of the float, a rod swiveled to the inner end of said lever and the valve on the inlet pipe to coöperate with the float and prevent an overflow from the funnel, a gravity pipe attached to the funnel, means for conducting oil upwardly through a filtering medium and means for the withdrawal of the pure oil.

3. In a filter of the class specified, an upper receiving tank, a conducting pipe, a settling chamber at the lower extremity of the conducting pipe, a filtering medium above the settling chamber, a pure oil chamber disposed about the filtering medium, means for automatically adjusting the supply of oil from the receiving chamber to a given tension of the filtering medium, means for regulation of the tension of the medium, means for withdrawal of water from the receiving tank, means for withdrawing air from the settling chamber, means for withdrawing pure oil from the main chamber, a secondary settling chamber opening into the first settling chamber, a valve between the settling chambers, an angular air space formed in the upper part of the secondary settling chamber an air vent within said chamber opening through the upper wall of the angular air space, a cock at the outer extremity of the air vent, means for withdrawal of solid sediment from the secondary chamber, sight glasses on receiving chamber pure oil chamber and secondary settling chamber.

In testimony that we claim the foregoing as our own, we have hereunto affixed our signatures in the presence of two witnesses.

LUCIUS R. CLARK.
DWIGHT G. KREUL.

Witnesses:
GEORGE W. SCOTT,
COAINA M. SCOTT.